United States Patent
Fong et al.

(10) Patent No.: US 9,789,952 B2
(45) Date of Patent: Oct. 17, 2017

(54) METHODS AND APPARATUS OF NOTIFICATION OF A FLIGHT ASYMMETRY INFLUENCING AN AIRCRAFT

(71) Applicant: The Boeing Company, Chicago, IL (US)

(72) Inventors: Dickson Fong, Everett, WA (US); Frederick Emil Ludtke, II, Freeland, WA (US)

(73) Assignee: The Boeing Company, Chicago, IL (US)

( * ) Notice: Subject to any disclaimer, the term of this patent is extended or adjusted under 35 U.S.C. 154(b) by 563 days.

(21) Appl. No.: 13/922,087

(22) Filed: Jun. 19, 2013

(65) Prior Publication Data

US 2015/0197329 A1    Jul. 16, 2015

(51) Int. Cl.
- *B64C 13/18* (2006.01)
- *G05D 1/08* (2006.01)
- *G05D 1/00* (2006.01)
- *B64D 43/00* (2006.01)

(52) U.S. Cl.
CPC .............. *B64C 13/18* (2013.01); *B64D 43/00* (2013.01); *G05D 1/0055* (2013.01); *G05D 1/0061* (2013.01); *G05D 1/0833* (2013.01)

(58) Field of Classification Search
None
See application file for complete search history.

(56) References Cited

U.S. PATENT DOCUMENTS

| | | | |
|---|---|---|---|
| 4,638,229 A | 1/1987 | Birkedahl | |
| 5,377,937 A * | 1/1995 | LaMay et al. | 244/185 |
| 5,521,579 A | 5/1996 | Bernhard | |
| 7,088,264 B2 | 8/2006 | Riley | |
| 7,098,810 B2 * | 8/2006 | Bateman et al. | 340/963 |
| 7,302,340 B2 | 11/2007 | Preston | |
| 7,436,323 B2 | 10/2008 | Ishihara et al. | |
| 7,957,853 B2 | 6/2011 | Stock et al. | |
| 7,976,310 B2 | 7/2011 | Bachelder et al. | |
| 8,112,225 B2 | 2/2012 | Eidehall et al. | |
| 8,275,516 B2 | 9/2012 | Murphy | |
| 8,279,109 B1 | 10/2012 | Piesinger | |
| 8,339,285 B2 | 12/2012 | Boren et al. | |
| 8,352,099 B1 * | 1/2013 | Eggold et al. | 701/4 |
| 8,380,367 B2 | 2/2013 | Schultz et al. | |

(Continued)

OTHER PUBLICATIONS

Steven R. Jacobson, "Aircraft Loss of Control Causal Factors and Mitigation Challenges," 18 pages, American Institute of Aeronautics and Astronautics.

(Continued)

*Primary Examiner* — Mussa A Shaawat
*Assistant Examiner* — Abdhesh Jha
(74) *Attorney, Agent, or Firm* — Hanley, Flight & Zimmerman, LLC

(57) ABSTRACT

Methods and apparatus of notification of a flight asymmetry influencing an aircraft are disclosed herein. An example method includes monitoring a roll characteristic of an aircraft and determining an output of an autopilot system of the aircraft to control the roll characteristic. The example method further includes generating an alert based on the output and an authority of the autopilot system to control the roll characteristic.

23 Claims, 9 Drawing Sheets

(56) References Cited

U.S. PATENT DOCUMENTS 8,380,424 B2    2/2013  Bushnell
8,380,425 B2    2/2013  Duggan et al.

OTHER PUBLICATIONS

Steven R. Jacobson, "Aircraft Loss of Control Causal Factors and Mitigation Challenges," Aug. 3, 2010, 41 pages, AIAA GNC Conference, Toronto Canada.

European Patent Office, "Extended European Search Report", issued in connection with application No. 14168479.5 dated Jul. 6, 2015, 5 pages.

Canner et al., "A Portable Path Guidance System", Engineering in the Ocean Environment, IEEE International Conference (1974), 10 pages.

Summers et al., "Fly-by-Wire Sidestick Controller Evaluation", Society of Automotive Engineers, Inc. (1987), 10 pages.

D.L. Riggin, "Improving Flightcrew Awareness during Autopilot Operation", (4910-10-U) Department of Transportation, Federal Aviation Administration, Policy Statement No. ANM-99-01, Final Policy Statement (Feb. 22, 2001), 13 pages.

Hersman, D. "Safety Recommendation," National Transportation Safety Board, Washington, D.C. (May 18, 2011), 14 pages.

\* cited by examiner

METHODS AND APPARATUS OF NOTIFICATION OF A FLIGHT ASYMMETRY INFLUENCING AN AIRCRAFT

FIELD

The present disclosure relates generally to autopilot systems and, more particularly, to methods and apparatus of notification of a flight asymmetry influencing an aircraft.

BACKGROUND

Generally, an aircraft includes an autopilot system to control an aircraft during flight by monitoring characteristics of the aircraft such as, for example, airspeed, roll attitude, heading, and/or other characteristics and by controlling control systems of the aircraft. If the aircraft is influenced by a flight asymmetry (e.g., forces urging the aircraft to roll, pitch and/or yaw), the autopilot system may compensate for the flight asymmetry (e.g., prevent the aircraft from rolling) by adjusting a control system of the aircraft. For example, the autopilot system may rotate a yoke of the aircraft to adjust one or more control surfaces (e.g., a rudder, etc.) of the aircraft. However, traditional autopilot systems have limited authority to control the aircraft and alert the pilot of a flight asymmetry. As a result, the aircraft may roll if the autopilot system is not able to fully compensate for the flight asymmetry. In addition, the autopilot system may mask the non-normal influence acting upon the airplane that warrants flight crew awareness and subsequent corrective action. In other words, the autopilot may correct for an asymmetry problem such as a broken or malfunctioning control surface (non-normal influence), but does not identify the source of the problem. Rolling of the aircraft or other upset of the aircraft may be the pilot's first indication that the flight asymmetry is present.

SUMMARY

An example method includes monitoring a roll characteristic of an aircraft and determining an output of an autopilot system of the aircraft to control the roll characteristic. The example method further includes generating an alert based on the output and an authority of the autopilot system to control the roll characteristic.

Another example method includes determining a flight characteristic of an aircraft and determining an amount of roll authority utilized by an autopilot system of an aircraft. The example method further includes generating an alert based on the flight characteristic and the amount of roll authority.

Another example method includes monitoring a flight characteristic of an aircraft and monitoring an output of an autopilot system of the aircraft to control the flight characteristic. The example method further includes determining if the aircraft is influenced by a flight asymmetry based on the output and the flight characteristic and generating an alert if the aircraft is influenced by the flight asymmetry.

The features, functions and advantages that have been discussed can be achieved independently in various examples or may be combined in yet other examples further details of which can be seen with reference to the following description and drawings.

Figure 1:
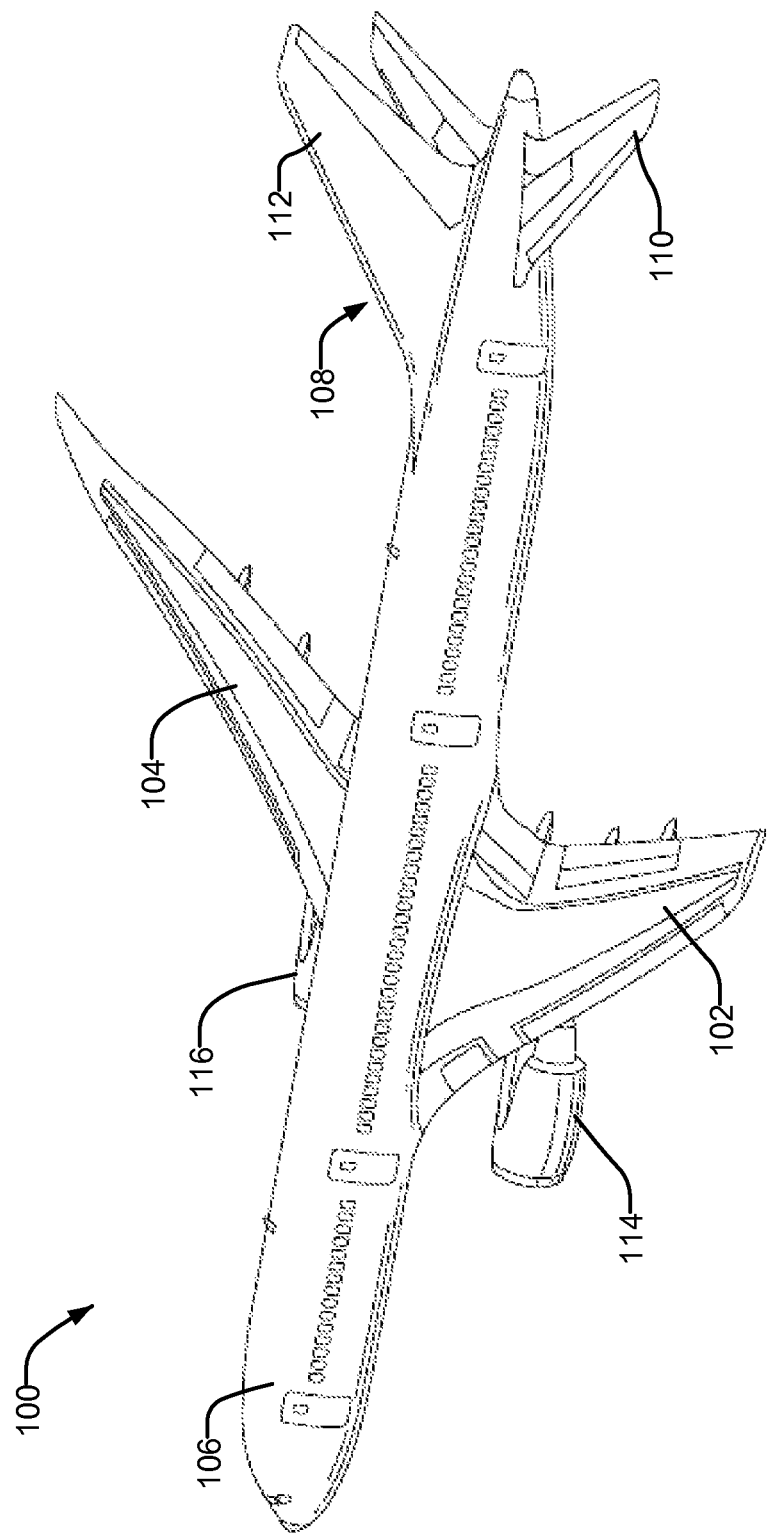
FIG. 1 illustrates an example aircraft that may be used to implement example methods and apparatus disclosed herein.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Methods and apparatus of notification of a flight asymmetry influencing an aircraft are disclosed herein. When a flight asymmetry influences an aircraft (e.g., when forces urge the aircraft to roll or yaw), an autopilot system of the aircraft compensates for the flight asymmetry by adjusting one or more control surfaces of the aircraft. However, the ability or "authority" of the autopilot system to make adjustments is limited and may become saturated. For example, the autopilot system may be capable of providing a predetermined range of outputs to control the aircraft and, thus, compensate for the flight asymmetry. However, if the autopilot system is providing a maximum output to compensate for the flight asymmetry, the authority of the autopilot system saturates and the aircraft may sustain an upset, for example, "roll" or "yaw" under the influence of the flight asymmetry.

In some examples, the autopilot system determines if the aircraft is under the influence of the flight asymmetry and communicates a command to generate an alert prior to saturation of the authority of the autopilot system. As a result, the examples disclosed herein enable the pilot operating the aircraft to be aware of the flight asymmetry before the flight asymmetry causes the aircraft to experience a sustained upset such as a roll, and to take subsequent action if needed.

In some examples, the autopilot system determines if the aircraft is not flying straight under the influence of the flight asymmetry, for example, if thrust asymmetry is causing a large bank angle beyond forty degrees. If the autopilot system determines that the aircraft is not flying substantially straight under the influence of the flight asymmetry (e.g., if the authority of the autopilot system is saturated), the autopilot system communicates a command to generate an alert indicating an action the pilot is to perform to compensate for the flight asymmetry. For example, the alert may indicate a direction in which the pilot is to rotate a yoke of the aircraft to prevent the aircraft from rolling.

FIG. 1 is a perspective view of an example aircraft 100 in which aspects of the present disclosure may be implemented. The example aircraft 100 of FIG. 1 includes a first wing 102, a second wing 104 and a fuselage 106. The example aircraft 100 also includes an empennage 108 having a horizontal stabilizer 110 and a vertical stabilizer 112 ("trim"). In the illustrated example, the aircraft 100 includes a first engine 114 and a second engine 116. The aircraft 100 of FIG. 1 is merely an example and, thus, other aircrafts may be used without departing from the scope of this disclosure.

Figure 2:
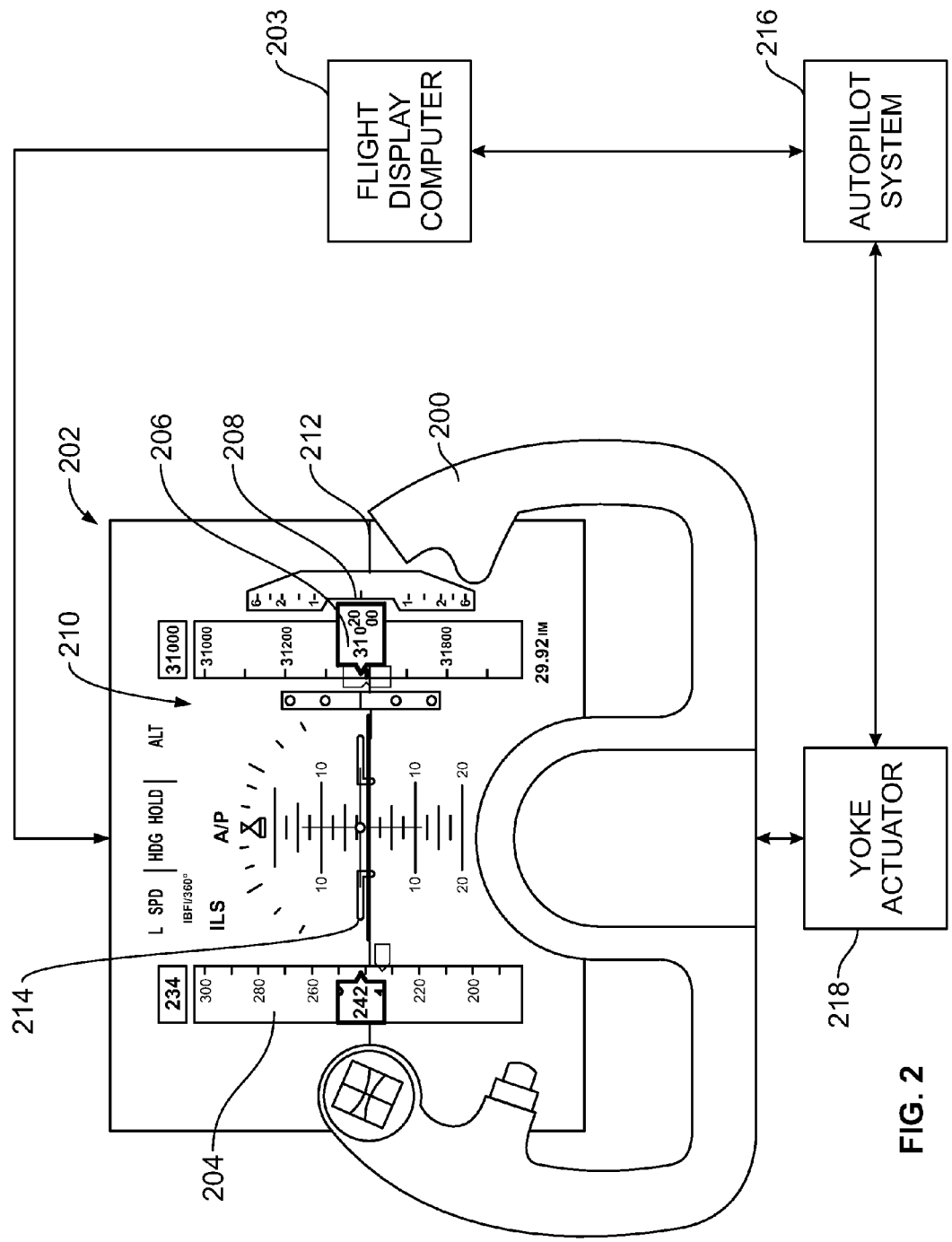
FIG. 2 illustrates an example autopilot system in communication with a flight display computer generating an example cockpit flight display of the aircraft of FIG. 1.

FIG. 2 illustrates an example wheel or yoke 200 and an example cockpit flight display 202 of the example aircraft 100 of FIG. 1. The example flight display 202 is generated by a flight display computer 203. In the illustrated example, the flight display 202 includes an airspeed indicator 204, an altitude indicator 206, a vertical speed indicator 208 and an attitude indicator 210. The example altitude indicator 206 indicates a roll attitude (e.g., a bank angle) of the aircraft 100 relative to a horizon 212. In the illustrated example, the aircraft 100 has a bank angle of substantially zero degrees and, thus, an aircraft symbol 214 displayed via the flight display 202 is substantially parallel to the horizon 212. In other examples, the flight display 202 includes different and/or additional indicators, information, symbols, graphics, etc.

One or more flight characteristics of the example aircraft 100 is controlled via an autopilot system 216. For example, the autopilot system 216 may control the first engine 114, the second engine 116, control surfaces (e.g., ailerons, elevators, rudders and/or any other control surfaces) and/or other components of the aircraft 100 to enable the aircraft 100 to fly along a path or course (e.g., toward a destination) (FIG. 1). In some examples, the autopilot system 216 controls a yoke actuator 218 operatively coupled to the yoke 200 to rotate the yoke 200 to control a roll characteristic of the aircraft 100 such as, for example, a roll attitude, a roll rate, a direction of roll, a change of heading, etc. In some examples, a pilot and/or a crew member of the aircraft 100 may engage or disengage the autopilot system 216 to enable or disable, respectively, control of the aircraft 100 via the autopilot system 216.

In the illustrated example, the autopilot system 216 may control a component of the aircraft 100 by providing one or more outputs. An output may be a command communicated by the autopilot system 216 to move, position, energize, and/or control the component in any way. The component may be, for example, the yoke actuator 218, the yoke 200, one or more control surfaces, the first engine 114, the second engine 116, and/or any other component of the aircraft 100. In some examples, the autopilot system 216 determines a characteristic of the component such as, for example, movement of the component, a position of the component, and/or any other characteristic. For example, the yoke actuator 218 and/or the yoke 200 may include one or more sensors in communication with the autopilot system 216. As a result, the autopilot system 216 may output a command to control the yoke actuator 218 to move the yoke 200 and receive information from the sensor(s) as an input. In some examples, based on the information, the autopilot system 216 determines a position of the yoke actuator 218 and/or the yoke 200. Thus, an output provided by the example autopilot system 216 may be determined based on a command communicated by the autopilot system 216 and/or based on a characteristic of a component of the aircraft 100.

In some examples, the autopilot system 216 has one or more modes of operation. For example, the autopilot system 216 may have a heading hold mode, a heading select mode, a landing mode (e.g., LAND 2, LAND 3, etc.), and/or any other mode. For example, when the autopilot system 216 is in the heading hold mode, the autopilot system 216 may control the aircraft 100 to substantially maintain a heading of the aircraft 100. When the autopilot system 216 is in the landing mode, the autopilot system 216 may control the aircraft 100 to land the aircraft 100.

A control authority of the example autopilot system 216 such as, for example, a roll authority of the autopilot system 216 via the yoke 200 is limited relative to a control authority of a pilot. Control authority is a range of outputs that may be provided to control the aircraft 100. For example, the roll authority of the autopilot system 216 may be limited by enabling the autopilot system 216 to rotate the yoke 200 less than a predetermined number of degrees relative to a reference position such as, for example, a pilot commanded position (e.g., a position to which the pilot has rotated the yoke 200). Thus, the autopilot system 216 may be prevented from rotating the yoke 200 greater than the predetermined number of degrees from the reference position. For example, the roll authority of the autopilot system 216 may be limited to command rotation of the yoke 200 by twenty degrees or less in a first direction (e.g., clockwise) or a second direction (e.g., counterclockwise) from the reference position. In some examples, the roll authority of the autopilot system 216 via the yoke 200 corresponds to about thirty percent of a maximum roll authority of the pilot via the yoke 200.

In some examples, a flight asymmetry influences the aircraft 100. For example, forces on the aircraft 100 during flight may urge that aircraft 100 to yaw, pitch and/or roll. As a result, the example autopilot system 216 may detect the flight asymmetry and provide one or more outputs to compensate for and/or counteract the flight asymmetry to trim the aircraft 100. In some examples, the autopilot system 216 may provide outputs within the control authority of the autopilot system 216 to fully compensate for the flight asymmetry. As a result, despite the flight asymmetry, the aircraft 100 may have a substantially level roll attitude (e.g., having a bank angle of about ten degrees or less) and fly substantially straight. When the example autopilot system 216 is providing a maximum output to compensate for the flight asymmetry, the roll authority of the autopilot system 216 is saturated (e.g., the autopilot system 216 cannot further compensate for the flight asymmetry). If the flight asymmetry further urges the aircraft 100 to roll once the roll authority of the autopilot system 216 saturates, the aircraft 100 rolls, which could cause the aircraft 100 to experience (sustain) an upset. The aircraft 100 is upset when the aircraft 100 is unintentionally exceeding parameters normally experienced in line operations or training and/or not flying as commanded (e.g., when the aircraft 100 is rolling in an uncommanded direction). In some examples, the roll authority of the autopilot system 216 is relative to the pilot commanded position. As a result, the pilot may unsaturate the roll authority of the autopilot system 216 (e.g., restore at least a portion of the roll authority of the autopilot system 216) by rotating the yoke 200 in a direction to compensate for the flight asymmetry. Accordingly, the autopilot system 216 and the pilot may cooperate to control the aircraft 100.

Figure 3:
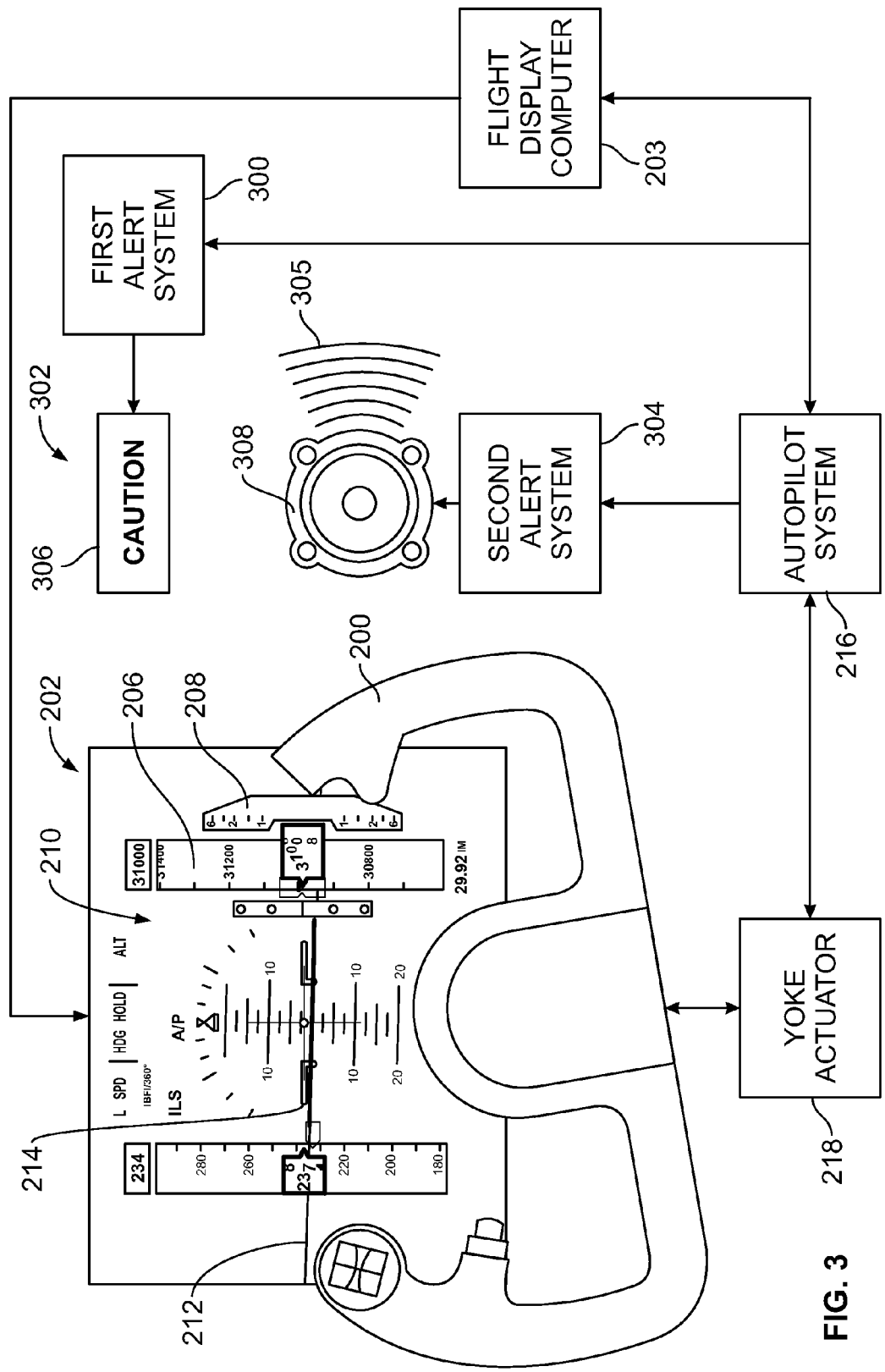
FIG. 3 illustrates an example alert when the example aircraft of FIG. 1 is flying substantially straight while under the influence of a flight asymmetry.

FIG. 3 illustrates the example flight display 202 and the example yoke 200 when the aircraft 100 is flying substantially straight while under the influence of a flight asymmetry. In the illustrated example, the autopilot system 216 is monitoring the roll attitude of the aircraft 100 and the output provided by the autopilot system 216 to the control the roll attitude of the aircraft 100. More specifically, the example autopilot system 216 is controlling at least a position of the yoke 200 via the yoke actuator 218 to control the roll attitude of the aircraft 100, and the example autopilot system 216 is monitoring the output by monitoring a position of the yoke 200.

In some examples, the autopilot system 216 determines that the aircraft 100 is flying substantially straight if the roll attitude of the aircraft 100 is less than or equal to a predetermined roll attitude. In the illustrated example, the predetermined roll attitude may be a bank angle of approximately 10 degrees and the bank angle of the aircraft 100 is approximately two degrees. Thus, in the illustrated example, the autopilot system 216 determines that the aircraft 100 is flying substantially straight because the bank angle is less than the predetermined bank angle. If the bank angle of the aircraft 100 is greater than ten degrees, the example autopilot system 216 determines that the aircraft 100 is not flying substantially straight. In other examples, the predetermined roll attitude is other bank angles (e.g., five degrees, 12 degrees, fifteen degrees, and/or any other roll attitude). In some examples, the autopilot system 216 determines if the aircraft 100 is flying substantially straight in other ways.

The example autopilot system 216 determines if a flight asymmetry is influencing the aircraft 100 while the aircraft 100 is flying substantially straight based on the output provided by the autopilot system 216 and/or the roll attitude of the aircraft 100. In some examples, if the autopilot system 216 utilizes at least a predetermined amount of roll authority for a predetermined amount of time to provide the output while the aircraft 100 is flying substantially straight, the autopilot system 216 determines that a flight asymmetry is influencing the aircraft 100. In some examples, the predetermined amount of roll authority is eight degrees of rotation of the yoke 200 from the pilot commanded position, and the predetermined amount of time is ten seconds. Thus, if the example autopilot system 216 provides an output to rotate the yoke 200 eight degrees or more for ten seconds or longer, the autopilot system 216 determines that the flight asymmetry is influencing the aircraft 100. In other examples, the predetermined amount of roll authority and/or the predetermined amount of time are other amounts. In some examples, the predetermined amount of roll authority is relative to a maximum amount of roll authority of the autopilot system 216. For example, the predetermined roll authority may be fifty percent of the maximum amount of roll authority of the autopilot system 216.

In some examples, the autopilot system 216 determines that a flight asymmetry is influencing the aircraft 100 while the aircraft 100 is flying substantially straight if the autopilot system 216 provides an output to rotate the yoke 200 eight degrees or more for ten seconds or longer and a roll rate of the aircraft 100 is less than one degree per second. In other examples, the autopilot system 216 determines that a flight asymmetry is influencing the aircraft 100 while the aircraft 100 is flying substantially straight if the autopilot system 216 provides an output to rotate the yoke 200 eight degrees or more for ten seconds or longer and a roll rate and/or a bank angle has transitioned from positive (e.g., rolling or banking right) to negative (e.g., rolling or banking left) or from negative to positive during a given time period such as, for example, one second.

In the illustrated example of FIG. 3, if the autopilot system 216 determines that the aircraft 100 is under the influence of the flight asymmetry and the aircraft 100 is flying substantially straight, the autopilot system 216 communicates a first command to a first alert system 300 (e.g., an engine instruments and crew alerting system ("EICAS")) to generate a first alert 302. In the illustrated example, the autopilot system 216 also communicates a second command to a second alert system 304 (e.g., an enhanced ground proximity warning system) to generate a second alert 305. The example the first alert 302 and/or the example second alert 305 notify the pilot and/or crew that the aircraft 100 is under the influence of a flight asymmetry while the aircraft 100 is flying substantially straight. Thus, in the illustrated example, the autopilot system 216 communicates the first command and/or the second command to generate the first alert 302 and/or the second alert 305 while the roll authority of the autopilot system 216 is unsaturated. In the illustrated example, the first alert 302 is a first graphic 306. In the illustrated example, the first graphic 306 is a textual message that reads "CAUTION." However, this is merely one example and any graphic, message or visual indicator (e.g., light, symbol, etc.) may be displayed and/or illuminated to implement the example first alert 302. The example second command instructs the second alert system 304 to generate a sound and/or an audible message via a speaker 308 such as, for example, one or more beeps, a voice stating "autopilot roll limit," and/or any other sound and/or audible message. In other examples, the autopilot system 216 communicates other numbers of commands to generate other numbers of alerts. For example, the autopilot system 216 may communicate a third command to generate a tactile alert (e.g., a vibration). In the illustrated example, the first alert 302 and/or the second alert 305 of FIG. 3 indicate that the flight asymmetry warrants substantially immediate pilot awareness and may require subsequent pilot action such as, for example, rotating the yoke 200 to restore some or all of the roll authority of the autopilot system 216. In other examples, the first alert 302 and/or the second alert 305 indicate other information.

Figure 4:
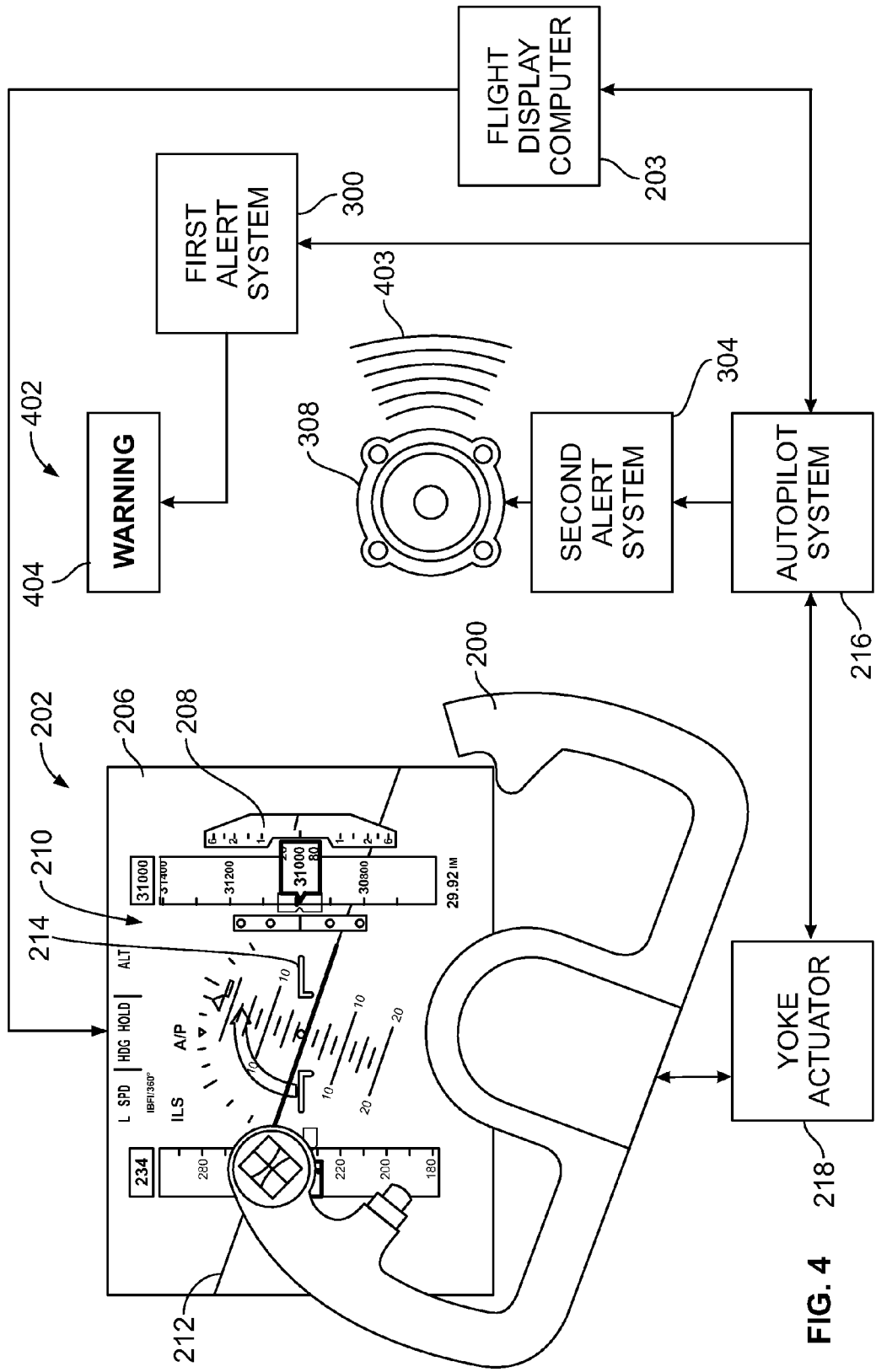
FIG. 4 illustrates an example alert when the aircraft of FIG. 1 is rolling under the influence of the flight asymmetry.

FIG. 4 illustrates the example flight display 202 and the example yoke 200 when the aircraft 100 is not flying substantially straight under the influence of a flight asymmetry. As discussed above in conjunction with FIG. 3, the autopilot system 216 monitors the roll attitude of the aircraft 100 and the output provided by the autopilot system 216 to control the roll attitude. If the roll attitude exceeds the predetermined roll attitude, the autopilot system 216 determines that the aircraft 100 is not flying substantially straight. In some examples, the predetermined roll attitude is a bank angle of ten degrees. In other examples, the predetermined roll attitude is other bank angles.

The example autopilot system 216 determines if a flight asymmetry is influencing the aircraft 100 to not fly substantially straight based on the output provided by the autopilot system 216 and the roll attitude of the aircraft 100. In some examples, the autopilot system 216 determines that the flight asymmetry is influencing the aircraft 100 to not fly substantially straight if, despite an output from the autopilot system 216 to roll the aircraft 100 in a first direction, the aircraft 100 rolls in a second direction at a roll rate greater than a predetermined roll rate. More specifically, the autopilot system 216 may determine that the flight asymmetry is influencing the aircraft 100 to not fly substantially straight if the following conditions are present: (1) the roll rate of the aircraft 100 is greater than a predetermined rate (e.g., ten degrees per second) and (2) the output provided by the autopilot system 216 is to rotate the yoke 200 at least a first predetermined amount (e.g., eight degrees from horizontal) in the first direction opposite the second direction in which the aircraft 100 is rolling.

In some examples, the autopilot system 216 determines that the flight asymmetry is influencing the aircraft 100 to not fly substantially straight if the aircraft 100 rolls a predetermined amount in an uncommanded direction (e.g., despite an output from the autopilot system 216 to roll the aircraft 100 in the first direction, the aircraft 100 rolls the predetermined amount in the second direction). In some examples, the predetermined amount of roll is based on a roll rate of the aircraft 100 over a predetermined amount of time. More specifically, the autopilot system 216 may determine that the flight asymmetry is influencing the aircraft to not fly straight if the following conditions are present: (1) the yoke 200 is rotated to at least a predetermined position (e.g., 16.5 degrees from horizontal) via the autopilot system 216, (2) the yoke 200 is rotating at a rate less than a predetermined rate (e.g., 0.1 degrees per second) via the autopilot system 216, and (3) the roll attitude of the aircraft 100 does not change in accordance with the output provided by the autopilot system 216 within the predetermined amount of time (e.g., during the predetermined amount of time, the aircraft 100 does not roll in a first direction in which the yoke 200 is rotated and/or the aircraft 100 rolls in a second direction opposite the first direction). In other examples, the autopilot system 216 determines if the flight asymmetry is influencing the aircraft 100 to not fly substantially straight based on different and/or additional conditions are present.

In some examples, the autopilot system 216 determines or selects the predetermined amount of time using a table or database including a plurality of roll rates or ranges of roll rates each associated with a given predetermined amount of time. For example, if the autopilot system 216 determines that the aircraft 100 is rolling at a rate of one degree per second and the table or graph includes a first amount of time associated with one degree per second, the autopilot system 216 selects the first amount of time as the predetermined amount of time. If the autopilot system 216 determines that the aircraft 100 is rolling at a rate of ten degrees per second and the table or graph includes a second amount of time associated with ten degrees per second, a flight asymmetry determiner 510 (FIG. 5) selects the second amount of time as the predetermined amount of time. In some examples, the autopilot system 216 determines the predetermined amount of time using a mathematical model (e.g., an equation such as, for example, Time=$9(\text{Roll Rate})^{-2}$). In some examples, the greater the roll rate, the shorter the predetermined amount of time and, thus, the sooner the autopilot system 216 determines that the flight asymmetry is influencing the aircraft 100 to not fly straight. In some examples, the amounts of time listed in the table or database range from 0.7 seconds to seven seconds. In other examples, other amounts of time are used.

In some examples, the autopilot system 216 determines that the flight asymmetry is influencing the aircraft 100 to not fly straight by determining that the roll attitude of the aircraft 100 is greater than a predetermined roll attitude such as, for example, a bank angle of forty degrees. In other examples, the autopilot system 216 determines that the flight asymmetry is influencing the aircraft 100 to not fly straight in other ways.

In some examples, the autopilot system 216 communicates a third command to the flight display computer 203, a fourth command to the first alert system 300 and a fifth command to the second alert system 304 to generate a third alert 400, a fourth alert 402 and a fifth alert 403, respectively, if the autopilot system 216 determines that the aircraft 100 is under the influence of the flight asymmetry that causes the aircraft 100 to not fly straight. In other examples, the autopilot system 216 communicates one or more additional and/or different commands.

The example third alert 400, the example fourth alert 402 and/or the example fifth alert 403 indicate that the flight asymmetry warrants substantially immediate pilot awareness and substantially immediate pilot action. In other examples, the third alert 400, the fourth alert 402 and/or the fifth alert 403 indicate different and/or additional information. In the illustrated example, the example third alert 400, the example fourth alert 402 and/or the example fifth alert 403 cooperate to indicate a pilot action such as, for example, rotation of the example yoke 200 of FIG. 4 to the right in the orientation of FIG. 4. In the illustrated example, the third alert 400 is a graphic displayed on the flight display 202. More specifically, the example third alert 400 is a curved arrow pointing in a direction in which the pilot is to rotate the yoke 200 to compensate for the flight asymmetry (e.g., to trim the aircraft 100). In the illustrated example, the fourth alert 402 is a second graphic 404. The example second graphic 404 is a textual message that reads "WARNING." However, these are merely examples and, thus, any type of alert (e.g., graphic, message and/or visual indicator (e.g., light, symbol, image, etc.)) may be used to implement the example third alert 400 and/or the fourth alert 402. In the illustrated example, the fifth alert 403 is a sound or an audible message generated via the speaker 308. In some examples, the fifth alert 403 is a voice stating the pilot action indicated by the third alert 400. For example, the voice may state "roll right" or "roll left." In some examples, the autopilot system 216 communicates a sixth command to generate a tactile alert (e.g., a vibration). In some examples, different and/or additional alerts are generated.

In some examples, the autopilot system 216 is enabled to communicate commands to generate one or more flight asymmetry alerts such as, for example, the first alert 302, the second alert 305 the third alert 400, the fourth alert 402, the fifth alert 403, and/or any other flight asymmetry alert if one or more conditions are present and/or if one or more conditions are not present. For example, the autopilot system 216 may be enabled to communicate a command to generate a flight asymmetry alert when the aircraft 100 is flying and the autopilot system 216 is engaged. Thus, in some examples, the autopilot system 216 may not communicate a command to generate an alert and/or the autopilot system 216 may reset an alert if the aircraft 100 is parked or taxiing. In some examples, the autopilot system 216 may not communicate commands to generate the alerts and/or the autopilot system 216 may reset the alerts if the autopilot system 216 is disengaged, the autopilot system 216 is in a predetermined operational mode, other alerts and/or messages are being generated and/or displayed, and/or other conditions are present. In some examples, the autopilot system 216 does not communicate commands to generate alerts and/or the autopilot system 216 resets the alerts if an alert has been generated within a predetermined amount of time and a predetermined characteristic of the aircraft 100 is not present. The predetermined characteristic may be, for example, a heading of the aircraft 100, an engine thrust output, an altitude of the aircraft 100, deployment of landing gear, a predetermined position of one or more control surfaces, and/or any other characteristic. In some examples, the predetermined characteristic is relative to a characteristic of the aircraft 100 when the alert was generated and/or at any other time. For example, the predetermined characteristic may be a change in airspeed, a change in heading, a change in altitude, etc. from the corresponding characteristic of the aircraft 100 when the alert was generated. Thus, for example, the autopilot system 216 may reset the alerts if a predetermined change in heading does not occur within the predetermined amount of time after the alerts were generated.

Figure 5:
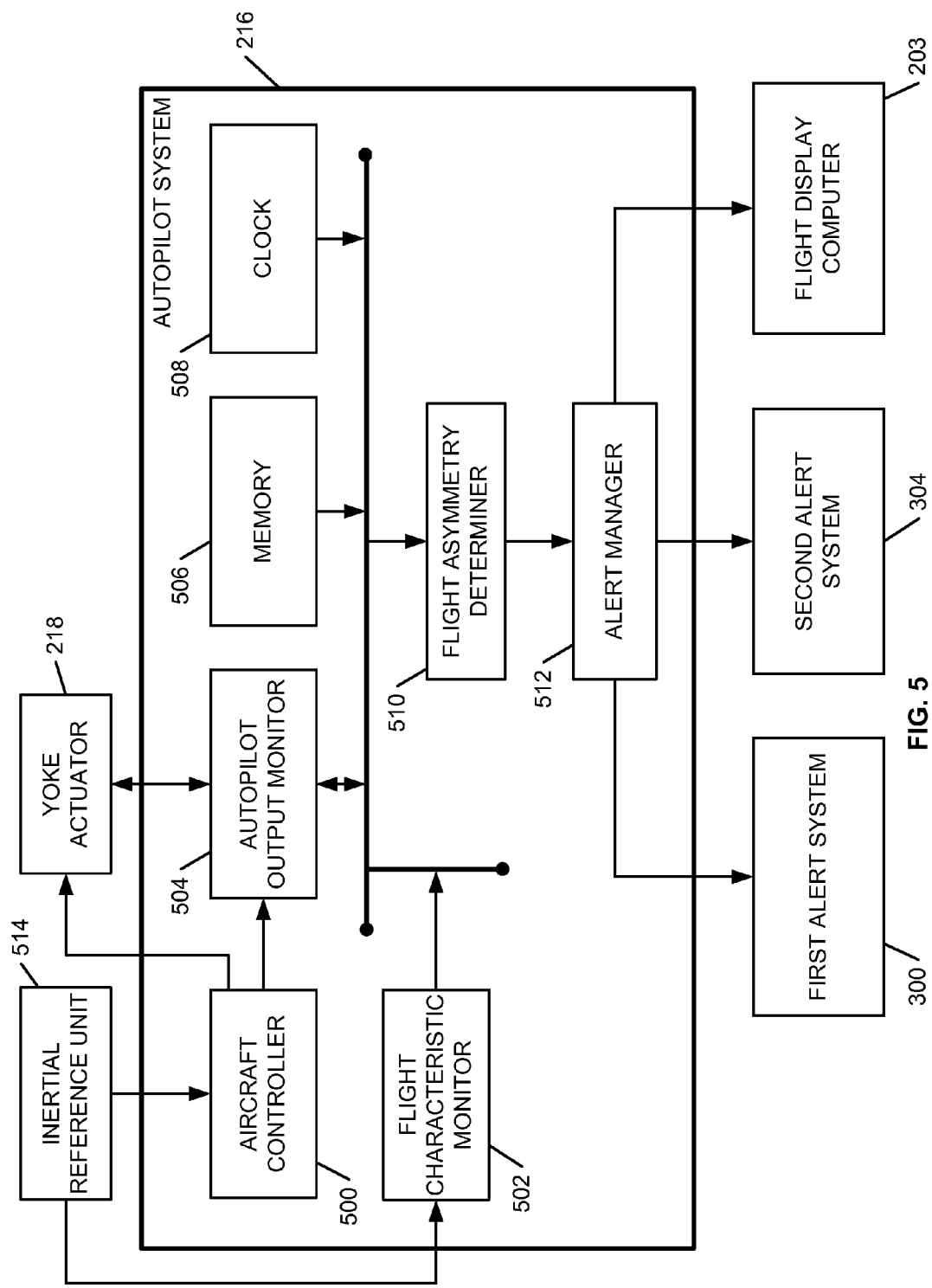
FIG. 5 is a block diagram of the example autopilot system of FIGS. 2-4.

FIG. 5 is a block diagram representative of the example autopilot system 216 of FIG. 2-4. In the illustrated example, the autopilot system 216 includes an aircraft controller 500, a flight characteristic monitor 502, an autopilot output monitor 504, a memory 506, a clock 508, the flight asymmetry determiner 510 and an alert manager 512.

In the illustrated example, the aircraft controller 500 provides outputs to control one or more control surfaces (e.g., ailerons, flaps, spoilers, elevators, etc.), the first engine 114, the second engine 116 and/or any other component(s) of the aircraft 100 to fly the aircraft 100 along a course (e.g., toward a destination). In the illustrated example, the aircraft controller 500 controls the yoke actuator 218 to control the yoke 200 to control one or more control surfaces of the aircraft 100. In the illustrated example, the aircraft controller 500 adjusts a position of the yoke 200 via the yoke actuator 218 based on one or more flight characteristics and/or other information communicated by an inertial reference unit 514.

The example inertial reference unit 514 determines one or more flight characteristics of the aircraft 100 such as, for example, one or more roll characteristics of the aircraft 100. Roll characteristics of the aircraft 100 include a roll attitude, a roll rate, a roll direction, a change of heading, etc. The example inertial reference unit 514 of FIG. 5 may determine the flight characteristic using, for example, one or more sensors, gauges, and/or devices such as, for example, a ring laser gyroscope, an accelerometer, a global positioning system (GPS) device, etc.

The example flight characteristic monitor 502 of FIG. 5 monitors the flight characteristics determined by the inertial reference unit 514 and/or determines flight characteristics. For example, the flight characteristic monitor 502 of FIG. 5 may monitor the roll attitude of the aircraft 100 determined via the inertial reference unit 514. Based on the roll attitude of the aircraft 100, the flight characteristic monitor 502 determines if the aircraft 100 is flying substantially straight. In some examples, the flight characteristic monitor determines if the aircraft 100 is flying substantially straight by determining if the roll attitude is equal to or less than a predetermined roll attitude (e.g., a bank angle of ten degrees).

The example autopilot output monitor 504 of FIG. 5 monitors the outputs provided by the aircraft controller 500 to control the aircraft 100. In some examples, the autopilot output monitor 504 monitors the outputs provided by the aircraft controller 500 by determining a position and/or movement (e.g., a rate of rotation) of the yoke 200. In some examples, the autopilot output monitor 504 monitors the outputs by determining an amount of roll authority utilized by the autopilot system 216 to control the aircraft 100 via the outputs. In some examples, the autopilot output monitor 504 monitors the output by determining a command communicated by aircraft controller 500 such as, for example, a rate of change of the position of the yoke 200 commanded by the aircraft controller 500 and/or a direction of rotation of the yoke 200 commanded by the aircraft controller 500. In some examples, the autopilot output monitor 504 determines an amount of time in which the aircraft controller 500 is commanding the yoke 200 to and/or passed a predetermined position. In the illustrated example, the autopilot output monitor 504 receives timing information from the example clock 508.

The example memory 506 may store information such as, for example, a table including predetermined time periods and/or roll rates associated with the predetermined time periods. In some examples, the memory stores commands to generate alerts (e.g., the first alert 302, the second alert, the third alert 400, the fourth alert 402, the fifth alert 403, etc.), values and/or states of flight characteristic and/or other information.

The example flight asymmetry determiner 510 determines if the aircraft 100 is influenced by a flight asymmetry. In some examples, the flight asymmetry determiner 510 determines if the aircraft 100 is influenced by a flight asymmetry while the aircraft 100 is flying substantially straight and/or the roll authority of the example autopilot system 216 is unsaturated. In some examples, the flight asymmetry determiner 510 determines if a flight asymmetry is influencing the aircraft 100 to not flying substantially straight. For example, the flight asymmetry determiner 510 may determine if the roll authority of the autopilot system 216 is saturated and the flight asymmetry is influencing the aircraft 100 to roll. In some examples, the flight asymmetry determiner 510 determines that the aircraft 100 is influenced by the flight asymmetry based on the output of the aircraft controller 500 detected via the autopilot output monitor 504 and the roll attitude of the aircraft 100 determined via the inertial reference unit 514.

The example alert manager 512 of FIG. 5 communicates commands and/or instructions to the first alert system 300, the second alert system 304, the flight display computer 203 and/or any other computing system of the aircraft 100 to generate one or more alerts. In some examples, the alert manager 512 communicates commands and/or instructions to generate one or more alerts indicating an action to be performed by the pilot based on the flight asymmetry influencing the aircraft 100 and/or an amount of roll authority utilized by the autopilot system 216. For example, if the flight asymmetry determiner 510 determines that a flight asymmetry is influencing the aircraft 100 while the aircraft controller 500 is controlling the aircraft 100 to fly substantially straight and, thus, the autopilot system 216 is operating within its roll authority, the alert manager 512 may communicate one or more commands to generate one or more alerts (e.g., graphics, sounds, messages, and/or any other alert) to notify the pilot of the flight asymmetry. Thus, the example autopilot system 216 notifies the pilot of the flight asymmetry while the flight asymmetry is masked by the outputs of the autopilot system 216.

In some examples, if the flight asymmetry determiner 510 determines that the roll authority of the autopilot system 216 is saturated and the flight asymmetry is influencing the aircraft 100 to roll in a first direction, the alert manager 512 may communicate a first command to the flight display computer 203 to display a graphic (e.g., an arrow) indicating that the pilot is to rotate the yoke 200 in a second direction opposite the first direction. In some examples, the alert manager 512 also communicates a second command to the second alert system 304 to generate an audible alert such as, for example, a sound or voice indicating the action to be performed by the pilot. For example, the second alert system 304 may generate a voice stating "roll right" or "roll left." In some examples, the first alert and the second alert cooperate to indicate the pilot action by, for example, generating a visual indication and an audible indication of the pilot action.

In some examples, the alert manager 512 resets (e.g., turns off) one or more alerts based on the flight asymmetry and/or the amount of roll authority utilized by the autopilot system 216. For example, the alert manager 512 may communicate a command to the flight display computer 203 to stop displaying a graphic on the flight display 202 if the influence of the flight asymmetry lessens such that the autopilot system 216 utilizes less than a predetermined amount of roll authority to control the aircraft 100 and/or the pilot performs an action (e.g., rotates the yoke 200) that enables the autopilot system 216 to utilize less than the predetermined amount of roll authority.

In some examples, the alert manager 512 enables the autopilot system 216 to communicate the commands to generate the alerts. For example, the alert manager 512 may enable the autopilot system 216 to communicate the commands to generate the alerts if the autopilot system 216 is engaged and the aircraft 100 is flying. In some examples, the alert manager 512 may disable the autopilot system 216 from communicating the commands to generate the alerts and/or communicate commands to reset the alerts if the aircraft 100 is parked or taxiing, the autopilot system 216 is disengaged, and/or the autopilot system 216 is in a predetermined operational mode such as, for example, a landing mode. In other examples, the alert manager 512 enables or disables the autopilot system 216 from communicating the commands to generate the alerts if one or more other conditions are present and/or not present.

While an example manner of implementing the autopilot system 216 of FIG. 2 is illustrated in FIG. 5, one or more of the elements, processes and/or devices illustrated in FIG. 5 may be combined, divided, re-arranged, omitted, eliminated and/or implemented in any other way. Further, the example aircraft controller 500, the example flight characteristic monitor 502, the example autopilot output monitor 504, the example memory 506, the example clock 508, the example flight asymmetry determiner 510, the example, alert manager 512, the example inertial reference unit 514, the example first alert system 300, the example second alert system 304, the example flight display computer 203 and/or, more generally, the example autopilot system 216 of FIG. 5 may be implemented by hardware, software, firmware and/or any combination of hardware, software and/or firmware. Thus, for example, any of the example aircraft controller 500, the example flight characteristic monitor 502, the example autopilot output monitor 504, the example memory 506, the example clock 508, the example flight asymmetry determiner 510, the example, alert manager 512, the example inertial reference unit 514, the example first alert system 300, the example second alert system 304, the example flight display computer 203 and/or, more generally, the example autopilot system 216 of FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example aircraft controller 500, the example flight characteristic monitor 502, the example autopilot output monitor 504, the example memory 506, the example clock 508, the example flight asymmetry determiner 510, the example, alert manager 512, the example inertial reference unit 514, the example first alert system 300, the example second alert system 304, the example flight display computer 203 and/or, more generally, the example autopilot system 216 of FIG. 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example aircraft controller 500, the example flight characteristic monitor 502, the example autopilot output monitor 504, the example memory 506, the example clock 508, the example flight asymmetry determiner 510, the example, alert manager 512, the example inertial reference unit 514, the example first alert system 300, the example second alert system 304, the example flight display computer 203 and/or, more generally, the example autopilot system 216 of FIG. 5 may include one or more elements, processes and/or devices in addition to, or instead of, those illustrated in FIG. 5, and/or may include more than one of any or all of the illustrated elements, processes and devices.

Figure 6:
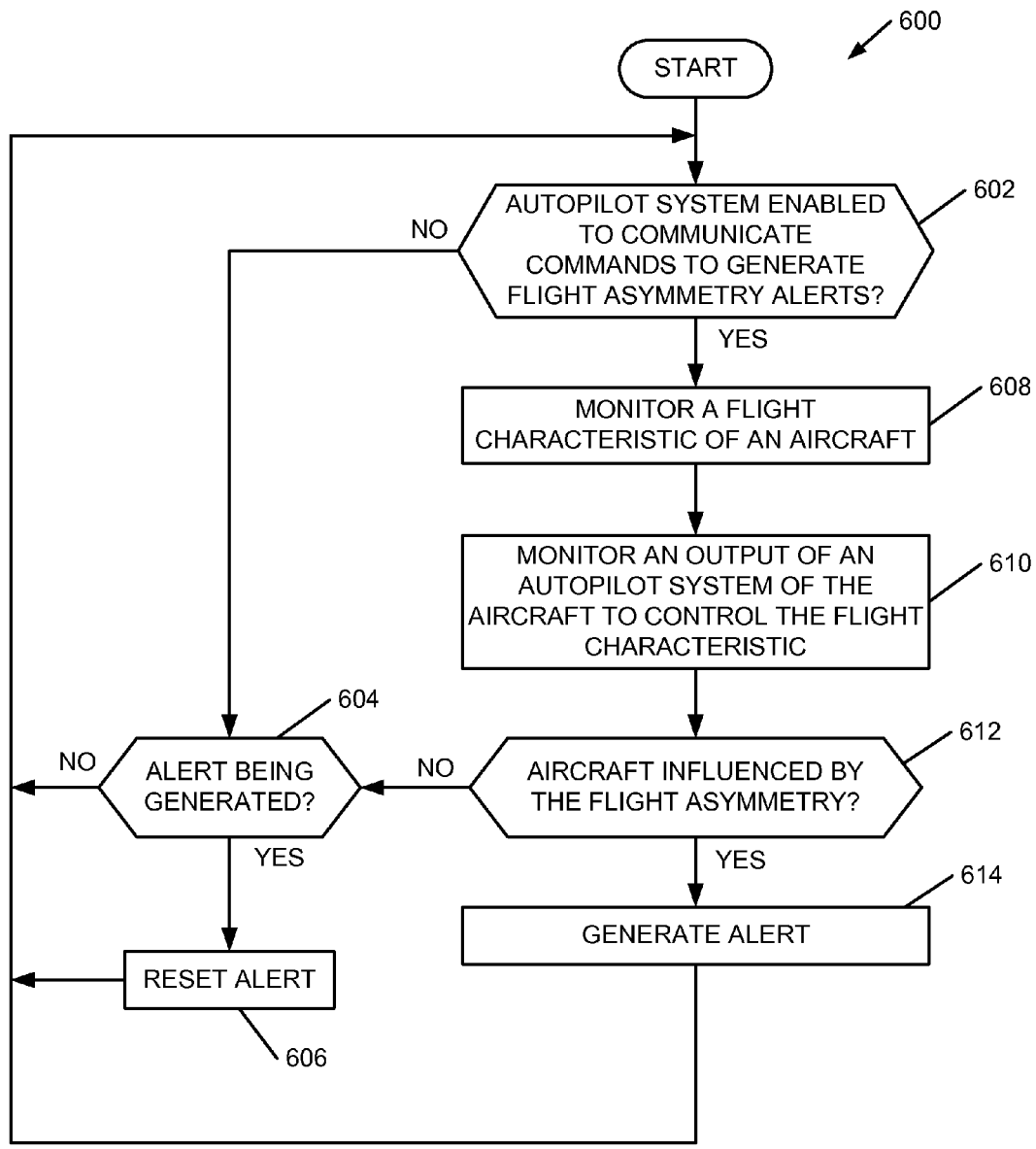
FIG. 6 is a flow diagram of an example method disclosed herein.
Figure 7:
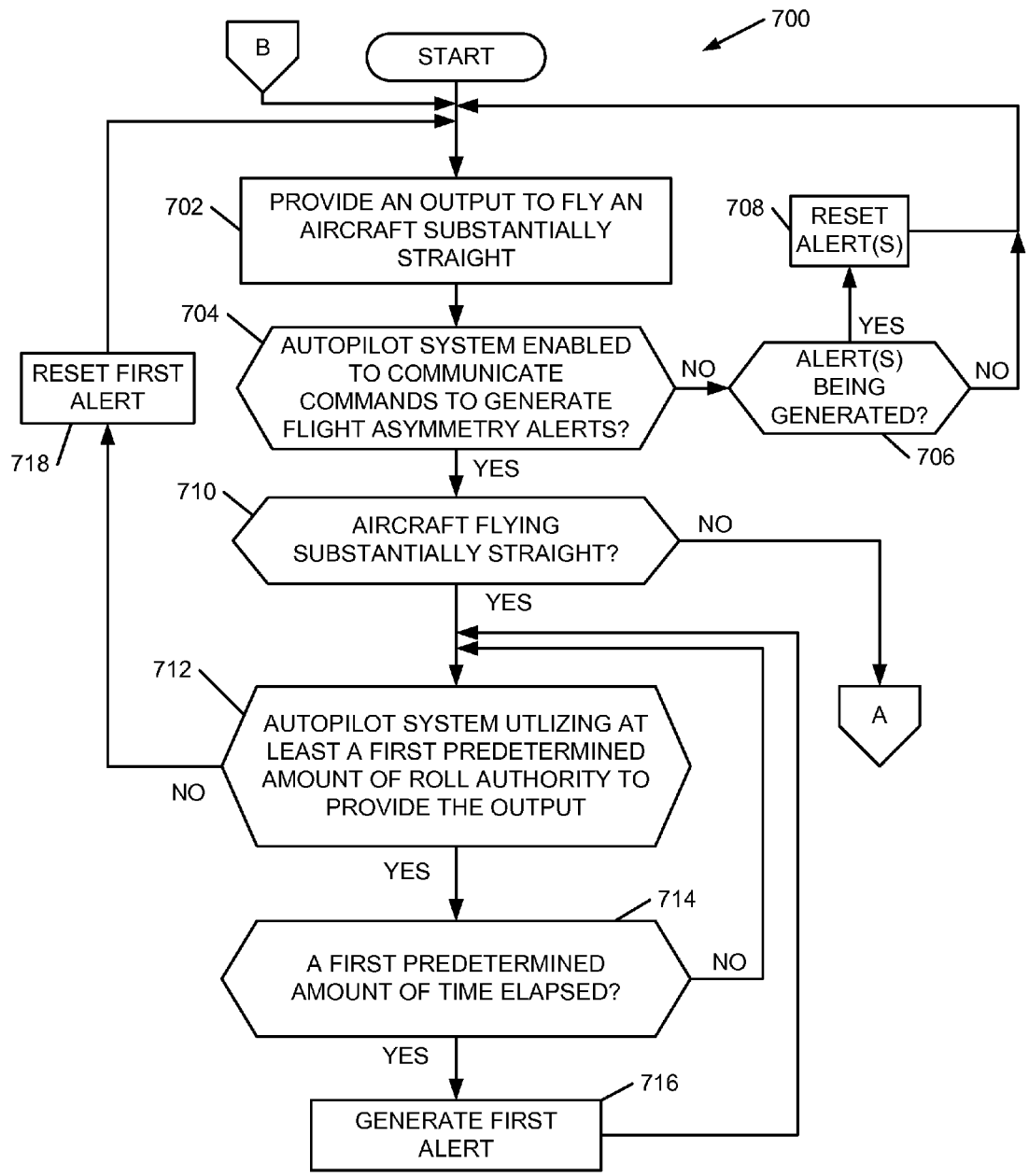
FIGS. 7-8 illustrate a flow diagram of an example method disclosed herein.
Figure 8:
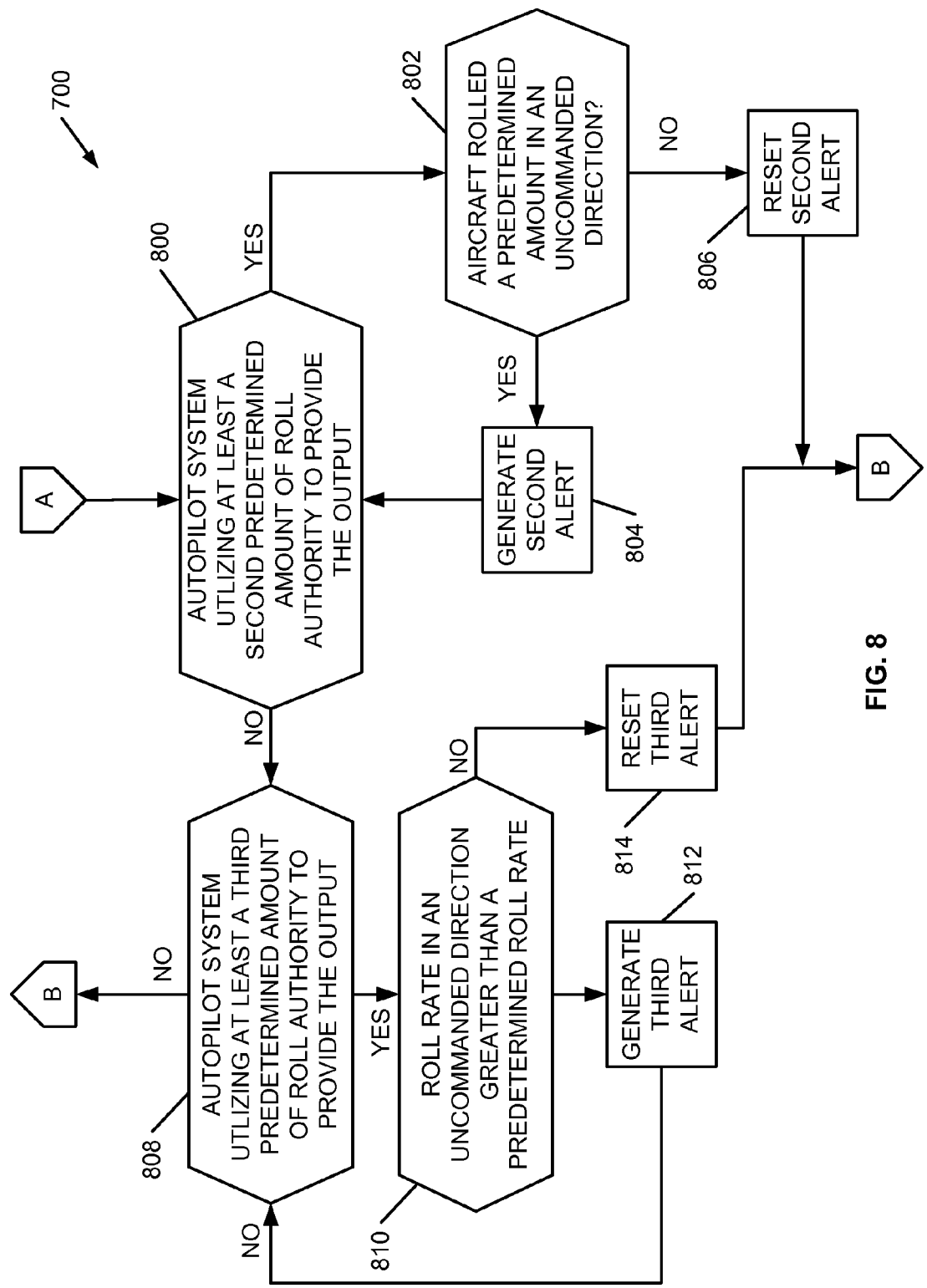

Flowcharts representative of example methods that may be used to implement the autopilot system 216 of FIG. 5 are shown in FIGS. 6-8. The methods may be implemented using machine readable instructions that comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example methods are described with reference to the flowcharts illustrated in FIGS. 6-8, many other methods of implementing the example autopilot system 216 may alternatively be used. For example, the order of execution of the blocks may be changed, and/or some of the blocks described may be changed, eliminated, or combined.

As mentioned above, the example method of FIGS. 6-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example method of FIGS. 6-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

FIG. 6 is a flowchart representative of an example method 600 disclosed herein. The example method 600 of FIG. 6 begins by the alert manager 512 determining if the autopilot system 216 is enabled to communicate commands to generate flight asymmetry alerts (block 602). For example, the alert monitor 512 may determine if the autopilot system 216 is enabled to communicate commands to generate flight asymmetry alerts by determining if one or more conditions are present and/or not present such as, for example, a mode of operation of the autopilot system 216, a flight characteristic of the aircraft 100, etc. If the autopilot system 216 is not enabled to communicate commands to generate flight asymmetry alerts, the alert manager 512 determines if an alert is being generated (block 604). If an alert is being generated, the alert manager 512 resets the alert (block 606). For example, the alert manager 512 may communicate a command to cease generation of the alert. In some examples, the alert manager 512 resets the alert by ceasing communication of a command to generate the alert.

If the autopilot system is enabled to communicate commands to generate flight asymmetry alerts (block 602), the flight characteristic monitor 502 monitors a flight characteristic of the aircraft 100 (block 608). For example, the flight characteristic monitor 502 may monitor a roll characteristic of the aircraft 100 such as, for example, a roll attitude of the aircraft 100, a roll rate of the aircraft 100, a direction of roll of the aircraft 100, a change of heading of the aircraft 100, etc. In some examples, the flight characteristic monitor 502 monitors a flight characteristic such as, for example, a heading of the aircraft 100, if the aircraft 100 is flying substantially straight, and/or any other flight characteristic and/or information. In some examples, the flight characteristic monitor 502 monitors if the aircraft 100 is flying substantially straight based on the roll attitude of the aircraft 100. For example, if the roll attitude of the aircraft 100 is less than a bank angle of ten degrees and the roll rate is less than one degree per second, the flight characteristic monitor 502 determines that the aircraft 100 is flying substantially straight. If the roll attitude of the aircraft 100 is a bank angle equal to or greater than ten degrees, the flight characteristic monitor 502 determines that the aircraft 100 is not flying substantially straight.

The example autopilot output monitor 504 monitors an output of the autopilot system 216 of the aircraft 100 to control the flight characteristic (block 610). In some examples, the autopilot output monitor 504 monitors the output by monitoring an amount of roll authority utilized by the autopilot system 216. In some examples, the autopilot output monitor 504 monitors the output of the autopilot system 216 by monitoring one or more commands communicated by the autopilot system 216 to the yoke actuator 218 to control the yoke 200. In some examples, the autopilot output monitor 504 monitors the output by monitoring a position of the yoke 200, a direction of rotation of the yoke 200, and/or rate of rotation of the yoke 200 and/or any characteristic of a component of the aircraft 100.

The flight asymmetry determiner 510 determines if the aircraft 100 is influenced by a flight asymmetry (block 612). In some examples, the flight asymmetry determiner 510 determines if the aircraft 100 is influenced by a flight asymmetry based on the output provided by the autopilot system 216 and the flight characteristic of the aircraft 100. In some examples, the flight asymmetry determiner 510 determines if the aircraft 100 is influenced by the flight asymmetry while the roll authority of the autopilot system 216 is unsaturated and the aircraft 100 is flying substantially straight. For example, if the autopilot output monitor 504 detects that the yoke 200 is commanded to at least a predetermined position for a predetermined amount of time, the flight asymmetry determiner 510 determines that the aircraft 100 is influenced by a flight asymmetry.

In some examples, the flight asymmetry determiner 510 determines that the aircraft 100 is influenced by the flight asymmetry while the aircraft 100 is flying substantially straight if the autopilot output monitor 504 detects that the yoke 200 is commanded to at least a predetermined position in a first direction for a predetermined amount of time and the flight characteristic monitor 502 determines that bank angle of the aircraft 100 changes from the first direction (e.g., in which the yoke 200 is rotated via the aircraft controller 500) to a second direction (e.g., banked to the left by one degree) opposite the first direction.

In some examples, the flight asymmetry determiner 510 determines that the aircraft 100 is influenced by the flight asymmetry while the aircraft 100 is flying substantially straight if the autopilot output monitor 504 detects that the yoke 200 is commanded to at least the predetermined position in the first direction for the predetermined amount of time and the flight characteristic monitor 502 determines that the roll rate of the aircraft 100 is less than a predetermined roll rate (e.g., one degree per second). In other examples, the flight asymmetry determiner 510 determines that the aircraft is influenced by the flight asymmetry if other conditions are present.

In some examples, the flight asymmetry determiner 510 determines if the aircraft 100 is influenced by the flight asymmetry after the roll authority of the autopilot system 216 is saturated and/or the aircraft 100 is not flying substantially straight. For example, the flight asymmetry determiner 510 may determine that the aircraft 100 is influenced by the flight asymmetry if the yoke 200 is rotated to at least a predetermined position and the roll rate of the aircraft 100 in an uncommanded direction exceeds a predetermined roll rate. More specifically, the flight asymmetry determiner 510 may determine that the aircraft 100 is influenced by the flight asymmetry if the autopilot output monitor 504 determines that the output provided by the aircraft controller 500 is a command to rotate the yoke 200 at least a first predetermined amount (e.g., eight degrees from horizontal) in first direction while the roll rate is in a second direction and is greater than the predetermined rate (e.g., ten degrees per second).

In some examples, the flight asymmetry determiner 510 determines that the aircraft 100 is influenced by the flight asymmetry after the roll authority saturates and/or the aircraft 100 is not flying substantially straight if the autopilot output monitor 504 determines that the yoke 200 is in at least a predetermined position relative to a reference position (e.g., 16.5 degrees from the pilot commanded position) and is rotating at a rate less than a predetermined rate (e.g., 0.1 degrees per second), and the flight characteristic monitor 502 determines that the roll attitude of the aircraft 100 does not change in accordance with the output provided by the aircraft controller 500 within a predetermined time period (e.g., during the predetermined amount of time, the aircraft 100 does not roll in the first direction in which the yoke 200 is rotated and/or the aircraft 100 rolls in the second direction opposite the first direction).

In some examples, the flight asymmetry determiner 510 determines that the aircraft 100 is influenced by the flight asymmetry by determining that the roll attitude of the aircraft 100 is greater than a predetermined roll attitude such as, for example, a bank angle of forty degrees. In other examples, the flight asymmetry determiner 510 determines that the flight asymmetry is influencing the aircraft 100 to not fly straight in other ways.

If the aircraft is influenced by the flight asymmetry, an alert is generated (block 614). In some examples, the alert is based on whether the flight asymmetry is determined before the roll authority of the autopilot system 216 is saturated or after the roll authority of the autopilot system 216 is saturated. For example, if the flight asymmetry determiner 510 determines before the roll authority is saturated (e.g., while the aircraft 100 is flying substantially straight) that the flight asymmetry is influencing the aircraft 100, the alert manager 512 may communicate a command to generate an alert indicating that the flight asymmetry warrants pilot awareness and may warrant subsequent pilot action. If the flight asymmetry determiner 510 determines after the roll authority is saturated (e.g., while the aircraft 100 is not flying substantially straight) that the flight asymmetry is influencing the aircraft 100, the alert manager 512 may communicate a command to generate an alert indicating that the flight asymmetry warrants immediate pilot attention and immediate pilot action such as, for example, rotation of the yoke 200. Thus, the example method 600 may be used to notify the pilot of an action to perform to prevent the aircraft 100 from upsetting under the influence of the flight asymmetry that has caused the roll authority of the autopilot system 216 to saturate.

In some examples, the alert manager 512 communicates one or more commands to the first alert system 300, the second alert system 304, and/or the flight display computer 203 to generate alerts, which may cooperate to indicate the pilot action (FIG. 5). For example, if the flight asymmetry causes the aircraft 100 to roll right from a perspective of the pilot operating the aircraft 100, the alert manager 512 may communicate a first command to the flight display computer 203 and a second command to the first alert system 300. The first command may be to display on the flight display computer 203 an arrow pointing left from the perspective of the pilot, and the second command may be to output a voice via the speaker 308 stating "roll left."

If the aircraft 100 is not influenced by the flight asymmetry (block 612), the alert manager 512 determines if an alert is being generated (block 604). If an alert is not being generated, the example method 600 returns to Start. If an alert is being generated, the alert manager 512 resets the alert (block 606).

FIG. 7 is a flowchart representative of another example method 700 disclosed herein. The example method 700 begins by the aircraft controller 500 providing an output to fly the aircraft 100 substantially straight (block 702). In some examples, the aircraft controller 500 provides the output by communicating a command to the yoke actuator 218 to rotate the yoke 200 and/or move the yoke 200 to a given position.

The alert manager 512 determines if the autopilot system 216 is enabled to communicate commands to generate flight asymmetry alerts (block 704). For example, the alert monitor 512 may determine if the autopilot system 216 is enabled to communicate commands to generate flight asymmetry alerts by determining if one or more conditions are present and/or not present such as, for example, a mode of operation of the autopilot system 216, a flight characteristic of the aircraft 100, etc. If the autopilot system 216 is not enabled to communicate commands to generate flight asymmetry alerts, the alert manager 512 determines if an alert is being generated (block 706). If an alert is being generated, the alert manager 512 resets the alert (block 708). The example method 700 then returns to block 702. If an alert is not being generated (block 706), the example method 700 returns to block 702.

If the autopilot system is enabled to communicate commands to generate flight asymmetry alerts (block 704), the flight characteristic monitor 502 determines if the aircraft 100 is flying substantially straight (block 710). In some examples, the flight characteristic monitor 502 determines if the aircraft 100 is flying substantially straight based on a roll attitude of the aircraft. For example, if the aircraft 100 has a roll attitude less than a predetermined bank angle (e.g., ten degrees), the flight characteristic monitor 502 determines that the aircraft 100 is flying substantially straight. If the aircraft 100 has a roll attitude greater than the predetermined bank angle, the flight characteristic monitor 502 determines that the aircraft 100 is not flying substantially straight (e.g., the aircraft 100 is rolling).

If the aircraft 100 is flying substantially straight, the flight asymmetry determiner 510 determines if the autopilot system 216 is utilizing at least a first predetermined amount of roll authority to provide the output (block 712). In some examples, the autopilot output monitor 504 determines the amount of roll authority utilized by the autopilot system 216 based on a position of the yoke 200. Thus, in some examples, the first predetermined amount of roll authority may be in units of degrees of rotation of the yoke 200 from a reference position (e.g., a pilot commanded position). In some examples, the first predetermined amount of roll authority is in other units (e.g., a percentage of a maximum roll authority utilized by the autopilot system 216).

If the autopilot system 216 is utilizing at least the first predetermined amount of roll authority, the flight asymmetry determiner 510 determines if a first predetermined amount of time has elapsed (block 714). If the first predetermined amount of time elapsed while the autopilot system 216 utilized at least the first predetermined amount of roll authority, the alert manger 512 communicates a command to the first alert system 300, the second alert system 304, the flight display computer 203, and/or any other cockpit display computer and/or system to generate one or more alerts. As a result, a first alert is generated (block 716). The example method 700 then returns to block 712. If the autopilot system 216 stops utilizing at least the first predetermined amount of roll authority, the first alert is reset (block 718). For example, if the amount of roll authority utilized by the autopilot system 216 decreases to below the first predetermined amount of roll authority, the alert manager 512 resets the first alert by communicating a command to the first alert system 300, the second alert system 304, and/or the flight display computer 203 to stop generating the first alert. In some examples, the alert manager 512 resets the first alert by ceasing communication of the command(s) to generate the first alert.

If the aircraft 100 is not flying substantially straight (block 710), the autopilot output monitor 504 determines if the autopilot system 216 is utilizing at least a second predetermined amount of roll authority to provide the output (block 800). In some example, the second predetermined amount of roll authority is 16.5 degrees of rotation of the yoke 200 from the reference position. In other examples, the second predetermined amount of roll authority is other amounts of rotation of the yoke 200 from the reference position. In some examples, the second predetermined amount of roll authority is in other units (e.g., a percentage of a maximum amount of roll authority utilized by the autopilot system 216).

If the autopilot system 216 is utilizing at least the second predetermined amount of roll authority to provide the output, the flight asymmetry determiner 510 determines if the aircraft 100 has rolled a predetermined amount in an uncommanded direction (block 802). The uncommanded direction is a first direction opposite a second direction in which the autopilot system 216 is commanding the aircraft 100 to roll via the output. In some examples, the flight asymmetry determiner 510 determines if the aircraft 100 has rolled the predetermined amount based on a roll rate of the aircraft 100 and a predetermined amount of time associated with the roll rate. If the aircraft 100 rolled the predetermined amount in the uncommanded direction, a second alert is generated (block 804). In some examples, two or more alerts are generated such as, for example, a visual indication and an audible indication of an action that the pilot of the aircraft 100 is to perform (e.g., rotation of the yoke 200 in the second direction). The example method 700 then returns to block 800. If the aircraft 100 has not rolled the predetermined amount in the uncommanded direction (block 802), the third alert is reset (block 806).

If the autopilot system 216 is not utilizing at least the second predetermined amount of roll authority (block 800), the autopilot output monitor 504 determines if the autopilot system 216 is utilizing at least a third predetermined amount of roll authority to provide the output (block 808). In some examples, the third predetermined amount of roll authority is less than the second predetermined amount of roll authority. For example, the third predetermined amount of roll authority may be eight degrees of rotation of the yoke 200 from the reference position. If the autopilot system 216 is utilizing at least the third predetermined amount of roll authority to provide the output, the flight asymmetry determiner 510 determines if the roll rate of the aircraft 100 in an uncommanded direction is greater than a predetermined roll rate (block 810). In some examples, the predetermined roll rate is ten degrees per second. In other examples, the predetermined roll rate is other amounts. If the roll rate of the aircraft 100 in the uncommanded direction is greater than the predetermined roll rate, a third alert is generated (block 812). In some examples, two or more alerts are generated such as, for example, a visual indication and an audible indication of an action that the pilot of the aircraft 100 is to perform (e.g., rotation of the yoke 200). If the roll rate of the aircraft 100 in the uncommanded direction is less than the predetermined roll rate (block 810), the third alert is reset (block 814). The example method 700 then returns to block 702.

Figure 9:
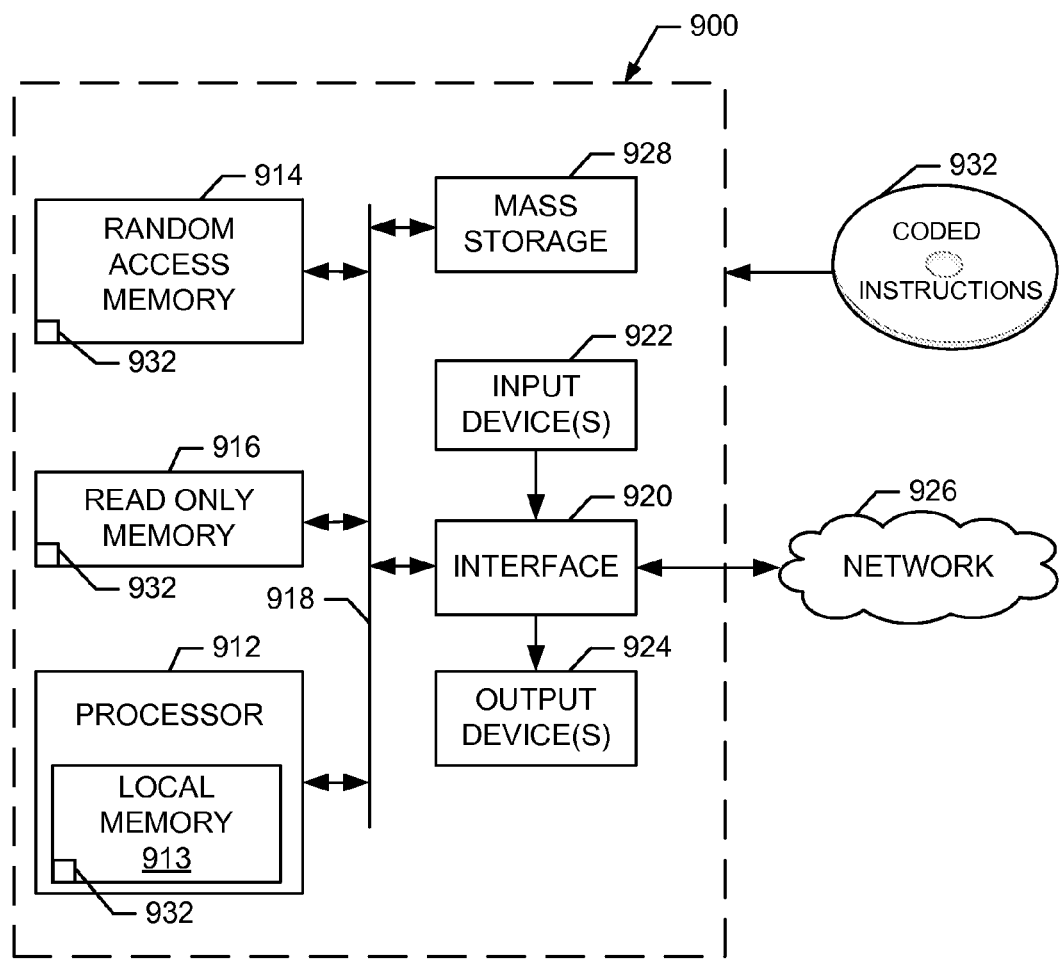
FIG. 9 is a block diagram of an example processing platform capable of executing machine readable instructions to implement the example autopilot system of FIGS. 2-5.

FIG. 9 is a block diagram of an example processor platform 900 capable of executing the example methods of FIGS. 6-8 to implement the autopilot system 216 of FIG. 5 The processor platform 900 can be, for example, a server, a computer (e.g., a flight control computer, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 to implement the methods of FIGS. 6-8 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture generate alerts to indicate that a flight asymmetry is influencing an aircraft. The examples disclosed herein generate alerts when a roll authority of an autopilot system is unsaturated. As a result, the examples disclosed herein enable a pilot operating the aircraft to be aware of the flight asymmetry while the aircraft is flying substantially straight. The examples disclosed herein also generate alerts indicating an action the pilot is to perform to compensate for the flight asymmetry when the roll authority of the autopilot system is saturated. Thus, the examples disclosed herein assist the pilot to reduce a likelihood of the aircraft upsetting Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for alerting a pilot of an aircraft of a flight asymmetry influencing the aircraft, the method comprising:
   monitoring a roll characteristic of the aircraft;
   determining an output of an autopilot system of the aircraft to control the roll characteristic;
   determining an amount of authority utilized by the autopilot system to control the roll characteristic;
   determining whether the aircraft is influenced by a first condition based on the output and the amount of authority, the first condition indicative of the flight asymmetry;
   detecting a second condition of at least one of the autopilot system or the aircraft, the second condition different from the first condition;
   determining whether the second condition indicates a presence or an absence of a predetermined condition for the at least one of the autopilot system or the aircraft;
   when the second condition indicates the presence or the absence of the predetermined condition, enabling communication of an instruction to generate an alert;
   communicating the instruction to generate the alert when (1) the aircraft is influenced by the first condition and (2) communication of the instruction to generate the alert is enabled based on the second condition; and
   generating the alert based on the instruction, the alert including a graphic to be displayed via a cockpit display, the graphic indicating one or more of a correction the pilot of the aircraft is to take or a direction in which the pilot is to rotate a yoke of the aircraft.

2. The method of claim 1, wherein the roll characteristic of the aircraft is selected from the group consisting of roll attitude, roll rate, direction of roll, and change of heading.

3. The method of claim 1, wherein the roll characteristic is roll attitude and generating the alert comprises generating the alert while the authority of the autopilot system is unsaturated.

4. The method of claim 1, wherein monitoring the roll characteristic comprises determining a roll rate of the aircraft.

5. The method of claim 1, wherein monitoring the roll characteristic comprises determining a direction of roll of the aircraft.

6. The method of claim 1, wherein determining the output comprises determining a position of a yoke of the aircraft.

7. The method of claim 1, wherein generating the alert comprises generating a first alert if the autopilot system utilizes at least a predetermined amount of the authority for a predetermined amount of time to provide the output.

8. The method of claim 1, wherein generating the alert comprises generating a first alert if the aircraft rolls a predetermined amount.

9. A method for alerting a pilot of an aircraft of a flight asymmetry influencing the aircraft, the method comprising:
   determining a flight characteristic of the aircraft;
   determining output of an autopilot system of the aircraft to control the flight characteristic;
   determining an amount of roll authority utilized by the autopilot system of the aircraft;
   determining whether the aircraft is influenced by a first condition based on the output and the amount of authority, the first condition indicative of the flight asymmetry;
   detecting a second condition of at least one of the autopilot system or the aircraft, the second condition different from the first condition;
   determining whether the second condition indicates a presence or an absence of a predetermined condition for the at least one of the autopilot system or the aircraft;
   when the second condition indicates the presence or the absence of the predetermined condition, enabling communication of an instruction to generate an alert;
   communicating the instruction to generate the alert when (1) the aircraft is influenced by the first condition and (2) communication of the instruction to generate the alert is enabled based on the second condition; and
   generating the alert based on the instruction, the alert including a graphic to be displayed via a cockpit display, the graphic indicating one or more of a correction the pilot of the aircraft is to take or a direction in which the pilot is to rotate a yoke of the aircraft.

10. The method of claim 9, wherein determining the flight characteristic comprises determining a roll rate of the aircraft.

11. The method of claim 9, wherein determining the flight characteristic comprises determining a roll attitude of the aircraft.

12. The method of claim 9, wherein determining the amount of roll authority comprises determining a yoke position commanded via the autopilot system.

13. The method of claim 9, wherein determining the flight characteristic comprises determining if the aircraft is flying substantially straight.

14. The method of claim 9, wherein generating the alert comprises communicating an instruction to output an audible alert.

15. A method for alerting a pilot of an aircraft of a flight asymmetry influencing the aircraft, the method comprising:
   determining an amount of roll authority utilized by an autopilot system of the aircraft to provide an output;
   monitoring a flight characteristic of the aircraft;
   monitoring the output to control the flight characteristic;
   determining whether the aircraft is influenced by a first condition based on the output and the amount of roll authority, the first condition indicative of the flight asymmetry;
   detecting a second condition of at least one of the autopilot system or the aircraft, the second condition different from the first condition;
   determining whether the second condition indicates a presence or an absence of a predetermined condition for the at least one of the autopilot system or the aircraft;
   when the second condition indicates the presence or the absence of the predetermined condition, enabling communication of an instruction to generate an alert;
   communicating the instruction to generate the alert when (1) the aircraft is influenced by the first condition and (2) communication of the instruction to generate the alert is enabled based on the second condition; and
   generating the alert based on the instruction, the alert including a graphic to be displayed via a cockpit display, the graphic indicating one or more of a correction the pilot of the aircraft is to take or a direction in which the pilot is to rotate a yoke of the aircraft.

16. The method of claim 15, wherein determining the amount of roll authority utilized by the autopilot system to provide the output comprises determining a degree of rotation of a yoke of the aircraft relative to a pilot commanded position of the yoke.

17. The method of claim 15, wherein determining whether the aircraft is influenced by the first condition comprises determining if the aircraft is rolling in an uncommanded direction.

18. The method of claim 17, wherein generating the alert comprises generating a first alert and a second alert, the first alert and the second alert to cooperate to indicate a pilot action.

19. The method of claim 18, wherein generating the alert comprises generating the alert after a roll authority of the autopilot system is saturated.

20. The method of claim 1, wherein the predetermined condition includes an operational mode of the autopilot system, a heading of the aircraft, a thrust output of an engine of the aircraft, an altitude of the aircraft, or a deployment of landing gear of the aircraft within a predetermined amount of time.

21. The method of claim 1, wherein the predetermined condition is an operational mode of the autopilot system and further comprising:

detecting the condition of the autopilot system as being in a landing mode; and refraining from enabling communication of the instruction to generate the alert based on the detection of the autopilot system as being in the landing mode.

22. The method of claim 9, wherein the predetermined condition includes an operational mode of the autopilot system, a heading of the aircraft, a thrust output of an engine of the aircraft, an altitude of the aircraft, or a deployment of landing gear of the aircraft within a predetermined amount of time.

23. The method of claim 15, wherein the predetermined condition includes an operational mode of the autopilot system, a heading of the aircraft, a thrust output of an engine of the aircraft, an altitude of the aircraft, or a deployment of landing gear of the aircraft within a predetermined amount of time.

* * * * *